US006238594B1

(12) United States Patent
Turpin et al.

(10) Patent No.: US 6,238,594 B1
(45) Date of Patent: May 29, 2001

(54) INTUMESCENT MATERIAL

(75) Inventors: Kenneth Albert Turpin, Delta (CA); Monroe W. Shumate, Littleton, CO (US); Robert D. Hamilton, Golden, CO (US); Walter A. Johnson, Aurora, CO (US); Steven N. Volenec, Englewood, CO (US); Edward A. Bright, Lakewood, CO (US); David J. Duquette, Loudonville, NY (US)

(73) Assignee: Passive Fire Protection Partners, Denver, CO (US)

( * ) Notice: Subject to any disclaimer, the term of this patent is extended or adjusted under 35 U.S.C. 154(b) by 0 days.

(21) Appl. No.: 09/190,750

(22) Filed: Nov. 12, 1998

(51) Int. Cl.⁷ .............................. C23F 11/00; C09K 21/00; C09K 21/04
(52) U.S. Cl. ................... 252/389.2; 252/387; 252/389.1; 252/601; 252/602; 252/606; 252/607; 252/608
(58) Field of Search ..................................... 252/601, 606, 252/607, 608, 387, 389.1, 389.2

(56) References Cited

U.S. PATENT DOCUMENTS

| Re. 34,951 | | 5/1995 | Slosberg et al. . | |
|---|---|---|---|---|
| 1,137,373 | * | 4/1915 | Aylsworth | 252/511 |
| 3,574,644 | * | 4/1971 | Olstowski et al. | 523/200 |
| 3,642,531 | | 2/1972 | Peterson . | |
| 3,945,962 | | 3/1976 | Clark . | |
| 4,043,950 | | 8/1977 | Wilmsen et al. . | |
| 4,176,071 | * | 11/1979 | Crouch | 252/602 |
| 4,179,535 | * | 12/1979 | Kalbskopf et al. | 427/206 |
| 4,191,675 | | 3/1980 | Inagaki et al. . | |
| 4,222,926 | | 9/1980 | Mizuno et al. . | |
| 4,273,879 | | 6/1981 | Langer et al. . | |
| 4,284,550 | | 8/1981 | Mizuno et al. . | |
| 4,563,491 | | 1/1986 | Comune . | |
| 4,689,256 | | 8/1987 | Slosberg et al. . | |
| 4,729,853 | * | 3/1988 | Von Bonin | 252/601 |
| 4,992,481 | * | 2/1991 | Von Bonin et al. | 521/54 |
| 5,057,367 | | 10/1991 | Morii et al. . | |
| 5,076,969 | * | 12/1991 | Fox | 252/601 |
| 5,132,054 | | 7/1992 | Stahl . | |
| 5,175,197 | | 12/1992 | Gestner et al. . | |
| 5,232,976 | | 8/1993 | Horacek et al. . | |
| 5,338,349 | | 8/1994 | Farrar . | |
| 5,498,466 | | 3/1996 | Navarro et al. . | |

* cited by examiner

Primary Examiner—Jill Warden
Assistant Examiner—LaToya Cross
(74) Attorney, Agent, or Firm—John D. Lister

(57) ABSTRACT

An intumescent material includes a liquid carrier with a corrosion inhibitor, such as a coating forming material, expandable particulate graphite (flake graphite or lump graphite) and if desired a filler. The intumescent material has a pH greater than 7.0, to reduce the corrosive properties of the intumescent material for most metals used in the construction industry and to provide a chemical environment conducive to the forming of a corrosion inhibiting layer by the corrosion inhibitor. The method of making the intumescent material includes combining the liquid carrier, the corrosion inhibitor, the expandable particulate graphite, the filler (if used), and a pH enhancer (if necessary to bring the intumescent material within the desired pH range), to form an intumescent material having a pH greater than 7.0.

6 Claims, No Drawings

INTUMESCENT MATERIAL

BACKGROUND OF THE INVENTION

The present invention relates to an intumescent material, and, in particular, to a intumescent material that can be applied as a caulking, coating or film, which includes a liquid carrier with a corrosion inhibitor, expandable particulate graphite, and a filler, if desired, and the method of making such an intumescent material.

Intumescent materials, which are commonly used as fire stopping barriers, typically include a liquid coating, caulking or film forming carrier, expandable graphite, and a filler. These materials, applied as caulking, coatings, films, etc., form passive fire protection systems which remain inactive until subjected to heat and temperatures such as those encountered from the flames of a fire. When these passive fire protection systems are subjected to heat and temperatures, such as those encountered in a fire, these intumescent materials react, grow and expand forming a char (many times the original thickness of the caulking, coating or film applied) to insulate the surface to which the material is applied, e.g. the surface of structural steel in a building, from the damaging effects of the heat generated by the fire.

Typically, the expandable graphite, used in these materials, is prepared from particulate, naturally occurring crystalline flake graphite or crystalline lump graphite, that has been acid treated to make the graphite intumescent. It is believed that the treatment of the crystalline flake graphite or crystalline lump graphite with concentrated sulfuric acid in the presence of an oxidizing agent, such as nitric acid, forms the compound graphite sulfate which exfoliates and expands upon heating.

While these materials can be quite effective as fire barriers, the acidic properties of the expandable graphite in these materials causes these materials to be corrosive to steel, stainless steel, copper, aluminum, galvanized steel and other metals or metal alloys, such as those commonly used in the construction industry. Thus, in applications, where these intumescent materials come in contact with metal components, e.g. girders and other structural members of buildings and the like, the use of these intumescent materials can cause corrosion problems or require the application of primers or other protective coatings to the metal components prior to the application of the intumescent material thereby increasing both labor and material costs.

SUMMARY OF THE INVENTION

The present invention provides a solution to the metal corrosion problems encountered with previous intumescent materials by providing an intumescent material, containing expandable particulate graphite, which is non-acidic (has a pH greater than 7.0) and contains a corrosion inhibitor so that the corrosion of metals by the intumescent material is greatly reduced or eliminated.

The intumescent material of the present invention includes a liquid carrier (such as but not limited to a caulking, coating or film forming material), expandable particulate graphite (preferably washed to remove residual acid or acid components), a corrosion inhibitor, and, if desired, one or more fillers. The intumescent material has a pH greater than 7.0, preferably, between about 7.5 and about 10.0, and most preferably between about 8.0 and about 8.5, to reduce the corrosive properties of the intumescent material with respect to most commonly used metals, such as those used in the construction industry, except aluminum, and to provide a chemically conducive environment for the corrosion inhibitor to form a protective layer on the metal to which the intumescent material is applied to prevent or greatly reduce corrosion on all commonly used metals including aluminum.

The preferred method of making the intumescent material includes washing the expandable particulate graphite with water to remove residual acid or acid components from the expandable particulate graphite and increase the pH of the expandable particulate graphite to about 7.0. The expandable particulate graphite is then added to a liquid carrier, such as a caulking, coating or film forming carrier, containing a corrosion inhibitor and, in most embodiments, a filler, to form the intumescent material of the present invention. As mentioned above, the intumescent material of the present invention (the liquid carrier with the expandable particulate graphite, the corrosion inhibitor and filler, if used) has a pH greater than 7.0, preferably between about 7.5 and about 10.0 and most preferably, between about 8.0 and about 8.5, to reduce the corrosive properties of the intumescent material and to provide a chemically conducive environment for the corrosion inhibitor to form a protective corrosion inhibiting layer on a metal to which the intumescent material is applied to prevent or greatly reduce corrosion. If the pH of the liquid carrier, to which the expandable particulate graphite is to be added, is not within the ranges set forth above, a pH enhancer (basic material) can be added directly to the carrier or applied to the washed expandable particulate graphite, prior to introducing the expandable particulate graphite into the carrier, to bring the intumescent material of the present invention within the required pH range.

DESCRIPTION OF THE PREFERRED EMBODIMENTS

Expandable particulate graphite, as used in the present invention, is prepared from particulate, naturally occurring crystalline flake graphite or crystalline lump graphite, that has been acid treated to make the particulate graphite intumescent. Preferably, the particulate is naturally occurring crystalline flake graphite. In the production of a preferred form of the expandable particulate graphite, it is believed that the treatment of the crystalline flake graphite or crystalline lump graphite with concentrated sulfuric acid in the presence of an oxidizing agent, such as nitric acid, forms the compound graphite sulfate which exfoliates and expands when exposed to a flame or any other heat source having a temperature of about 150° C. or greater. When exposed to temperatures of 150° C. or greater, the expandable particulate graphite used in the intumescent material of the present invention expands from about 20 to about 200 times its unexpanded volume to fill voids and cavities, form fire stopping layers, and otherwise form fire stopping barriers.

One method of preparing the naturally occurring crystalline flake graphite or crystalline lump graphite to make the particulate graphite expandable is disclosed in U.S. Pat. No. 3,574,644; issued Apr. 13, 1971; Franciszek Olstowski et al (the disclosure of U.S. Pat. No. 3,574,644, is hereby incorporated herein by reference in its entirety). As set forth in the '644 patent, the method includes contacting the particulate graphite, at about room temperature, (1) with a mixture of from about 8 to about 98 weight percent concentrated sulfuric acid (at least about 90 weight percent $H_2SO_4$) and from about 92 to about 2 weight percent concentrated nitric acid (at least about 60 weight percent $HNO_3$), or (2) with fuming nitric acid, or (3) with fuming sulfuric acid, or (4) with concentrated sulfuric acid (at least about 90 weight percent $H_2SO_4$) or concentrated nitric acid (at least 60 weight percent HNO$_3$), plus at least about 2 weight percent of a solid inorganic oxidizer, such as, for example, manganese dioxide, potassium permanganate, potassium chlorate, chromium trioxide, and the like. The resulting mix components usually are employed on a weight proportion basis from about 0.2–2/1 (acid member/graphite). These are maintained in contact for at least about one minute, although a contact time of hours or days is not detrimental. The acid treated graphite particulate, now expandable, is separated from any excess acid, water washed and dried.

In the preferred method of the present invention, any residual acid or acid components are removed from the expandable particulate graphite, preferably by washing the expandable particulate graphite with water, to increase the pH of the expandable particulate graphite to about 7.0 and eliminate or essentially eliminate potential corrosive agents from the expandable particulate graphite. Furthermore, if the residual acid or acid components are not removed from the expandable particulate graphite prior to introducing the expandable particulate graphite into and mixing the expandable particulate graphite with the carrier, the corrosion inhibitor (e.g. sodium hexa meta phosphate) in the carrier can change the acid residue or acid components on the expandable particulate graphite into salt.

In the preferred method, after the expandable particulate graphite has been thoroughly washed, the expandable particulate graphite is added to a liquid carrier, such as a caulking, coating or film forming carrier, containing a corrosion inhibitor and, in most embodiments, a filler, to form the intumescent material of the present invention. As mentioned above, the intumescent material of the present invention (the carrier with the expandable particulate graphite, the corrosion inhibitor and filler, if used) has a pH greater than 7.0, preferably between about 7.5 and about 10.0 and most preferably, between about 8.0 and about 8.5, to reduce the corrosive properties of the intumescent material with respect to most metals used in the construction industry, except aluminum, (e.g. steel, stainless steel, copper, and galvanized steel) and to provide a chemically conducive environment for the corrosion inhibitor to form a protective layer on any metal to which the intumescent material is applied to prevent or greatly reduce corrosion. If the pH of the liquid carrier, to which the expandable particulate graphite is to be added, is not within the ranges set forth above, a pH enhancer (basic material), such as but not limited to ammonium hydroxide or other hydroxides, can be added directly to the carrier or applied to the washed expandable particulate graphite, prior to introducing the expandable particulate graphite into the carrier, to bring the intumescent material of the present invention within the required pH range.

Preferably, the corrosion inhibitor, in or added to the carrier, is sodium hexa meta phosphate (which appears to work the best), tri sodium phosphate, sodium meta phosphate, sodium silicate or other sodium based phosphate compounds. At the pH levels used in the intumescent material of the present invention (i.e. above 7.0, preferably between about 7.5 and about 10.0 and most preferably, between about 8.0 and about 8.5) the phosphate or silicate precipitates out of the carrier to form a phosphate or silicate corrosion inhibiting layer on a metal surface that prevents oxygen from diffusing onto the metal surface. The corrosion inhibitors, listed above, function to form a protective layer when the pH is above 7.0. However, the corrosion inhibitors listed above, function better to form a protective layer when the pH of the intumescent material is between 7.5 and 10.0 and function best to form a protective layer when the pH level of the intumescent material is between about 8.0 and 8.5. Preferably, the corrosion inhibiting properties of the intumescent material of the present invention meet or exceed the following standards, ASTM C665.

The corrosion inhibitor can be introduced into the carrier in dry or solution form and is present in the carrier in sufficient quantities to form a protective layer on the metal being coated with the intumescent material to prevent or inhibit corrosion. For example, a carrier, such as an acrylic latex carrier, including between about 200 parts per million and about 10,000 parts per million sodium hexa meta phosphate and having a pH between about 7.5 and about 10.0 has been found to produce a satisfactory corrosion inhibiting layer. However, preferably, a carrier such as an acrylic latex carrier, including between about 1000 parts per million and about 2000 parts per million sodium hexa meta phosphate and having a pH between about 8.0 and about 8.5 is used to produce the corrosion inhibiting layer.

The liquid carrier used in the intumescent material of the present invention is a coating, caulking or film forming carrier, such as but not limited to, acrylic latexes, vinyl latexes, butadiene-styrene latexes, alkyl paints, epoxy solutions, urethane solutions, varnishes and lacquers. Whether liquid carrier is a caulking, coating or film forming carrier depends, in large part, on the viscosity of the carrier with the carrier being made more viscous for caulking applications and less viscous, e.g. by adding water or a solvent, for coating and film forming applications, such as spraying applications.

To reduce the cost of the intumescent material of the present invention, many of the embodiments of the present invention include a filler, preferably an inorganic filler. For example, fillers which can be used in the intumescent material of the present invention include, but are not limited to, calcium carbonate, magnesium carbonate, dolomite, mica, vermiculite, perlite, gypsum and various clays commonly used as fillers.

In embodiments of the intumescent material of the present invention which include a liquid carrier, such as the ones set forth above, and the expandable particulate graphite, but no fillers, the intumescent material is between about 40 and about 96 weight percent liquid carrier and between about 4 and 60 weight percent expandable particulate graphite. In embodiments of the intumescent material of the present invention which include fillers, the liquid carrier is between about 40 and about 60 weight percent of the intumescent material; the expandable particulate graphite is between about 4 and about 30 weight percent of the intumescent material; and the filler is between about 10 and about 50 weight percent of the intumescent material. In the preferred embodiments of the present invention which include fillers, the liquid carrier is between about 45 and about 55 weight percent of the intumescent material; the expandable particulate graphite is between about 5 and about 20 weight percent of the intumescent material; and the filler is between about 25 and about 40 weight percent of the intumescent material.

In describing the invention, certain embodiments have been used to illustrate the invention and the practices thereof. However, the invention is not limited to these specific embodiments as other embodiments and modifications within the spirit of the invention will readily occur to those skilled in the art on reading this specification. For example, while the intumescent material of the present invention is useful for application to metal surfaces, the intumescent material of the present invention can also be applied to other nonmetallic surfaces, e.g. gypsum board, and to fibrous carriers, such as but not limited to glass fiber and mineral wool mats, blankets and insulations. Thus, the invention is not intended to be limited to the specific embodiments disclosed, but is to be limited only by the claims appended hereto.

What is claimed is:

1. An intumescent material comprising:

a liquid carrier with a corrosion inhibitor present in the carrier in sufficient quantities to provide a corrosion inhibiting layer on a metal surface to which the intumescent material is applied; the corrosion inhibitor being sodium hexa meta phosphate and the carrier including between 1000 and 2000 parts per million sodium hexa meta phosphate; and expandable particulate graphite, the carrier with the expandable particulate graphite having a pH between 8.0 and 8.5 to reduce the corrosive properties of the intumescent material and provide a chemical environment conducive to the forming of the corrosion inhibiting layer by the sodium hexa meta phosphate corrosion inhibitor.

2. The intumescent material according to claim 1, wherein:

the carrier is a caulking, coating or film forming carrier with a corrosion inhibitor; and the carrier is between 40 and 96 weight percent of the intumescent material; and the expandable particulate graphite is between 4 and 60 weight percent of the intumescent material.

3. The intumescent material according to claim 1, wherein:

the carrier is a caulking, coating or film forming carrier with a corrosion inhibitor; and the intumescent material includes a filler.

4. The intumescent material according to claim 3, wherein:

the carrier is between 40 and 60 weight percent of the intumescent material; the expandable particulate graphite is between 4 and 30 weight percent of the intumescent material; and the filler is between 10 and 50 weight percent of the intumescent material.

5. The intumescent material according to claim 3, wherein:

the carrier is between 45 and 55 weight percent of the intumescent material; the expandable particulate graphite is between 5 and 20 weight percent of the intumescent material; and the filler is between 25 and 40 weight percent of the intumescent material.

6. The intumescent material according to claim 5, wherein:

the carrier is a latex material; the expandable particulate graphite is expandable flake graphite; and the filler is an inorganic filler.

* * * * *